United States Patent
Zhang et al.

(10) Patent No.: US 6,708,076 B2
(45) Date of Patent: Mar. 16, 2004

(54) SEWING APPARATUS MANAGEMENT SYSTEM

(75) Inventors: Rui Zhang, Nagoya (JP); Gyomei Tei, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 274 days.

(21) Appl. No.: 09/730,847

(22) Filed: Dec. 7, 2000

(65) Prior Publication Data

US 2001/0004717 A1 Jun. 21, 2001

(30) Foreign Application Priority Data

Dec. 16, 1999 (JP) .......................... 11-357388
Dec. 16, 1999 (JP) .......................... 11-357398

(51) Int. Cl.$^7$ .............................. G06F 7/66
(52) U.S. Cl. ................ 700/136; 112/470.06; 112/102.5
(58) Field of Search ............... 700/138, 136, 700/137; 112/102.5, 470.01, 470.04, 455, 470.06

(56) References Cited

U.S. PATENT DOCUMENTS

| | | | | |
|---|---|---|---|---|
| 5,662,055 A | * | 9/1997 | Hartwig et al. | 112/102.5 |
| 5,794,553 A | * | 8/1998 | Futamura | 112/102.5 |
| 5,801,949 A | * | 9/1998 | Raasch et al. | 700/130 |
| 5,921,194 A | * | 7/1999 | Komuro et al. | 112/470.01 |
| 6,105,520 A | * | 8/2000 | Frazer et al. | 112/117 |
| 6,415,196 B1 | * | 7/2002 | Crampton et al. | 700/100 |
| 6,502,006 B1 | * | 12/2002 | Laufer et al. | 700/138 |

* cited by examiner

Primary Examiner—Leo Picard
Assistant Examiner—Zoila Cabrera
(74) Attorney, Agent, or Firm—Oliff & Berridge, PLC

(57) ABSTRACT

In a sewing apparatus management system of the invention, a management computer is connected to each terminal provided to a plurality of embroidery sewing machines via a network line. In a memory of the management computer, classification information classified into a plurality of groups by predetermined categories by identifying each embroidery sewing machine is prestored. When a supervisor selects one of the plurality of groups using such as a mouse of the management computer, management information corresponding to the embroidery sewing machines attributed to the selected group is displayed on the CRT display. Thus, only the embroidery sewing machines attributed to the selected group are selectively managed. Further, instruction information is sent to only the selected embroidery sewing machines.

20 Claims, 15 Drawing Sheets

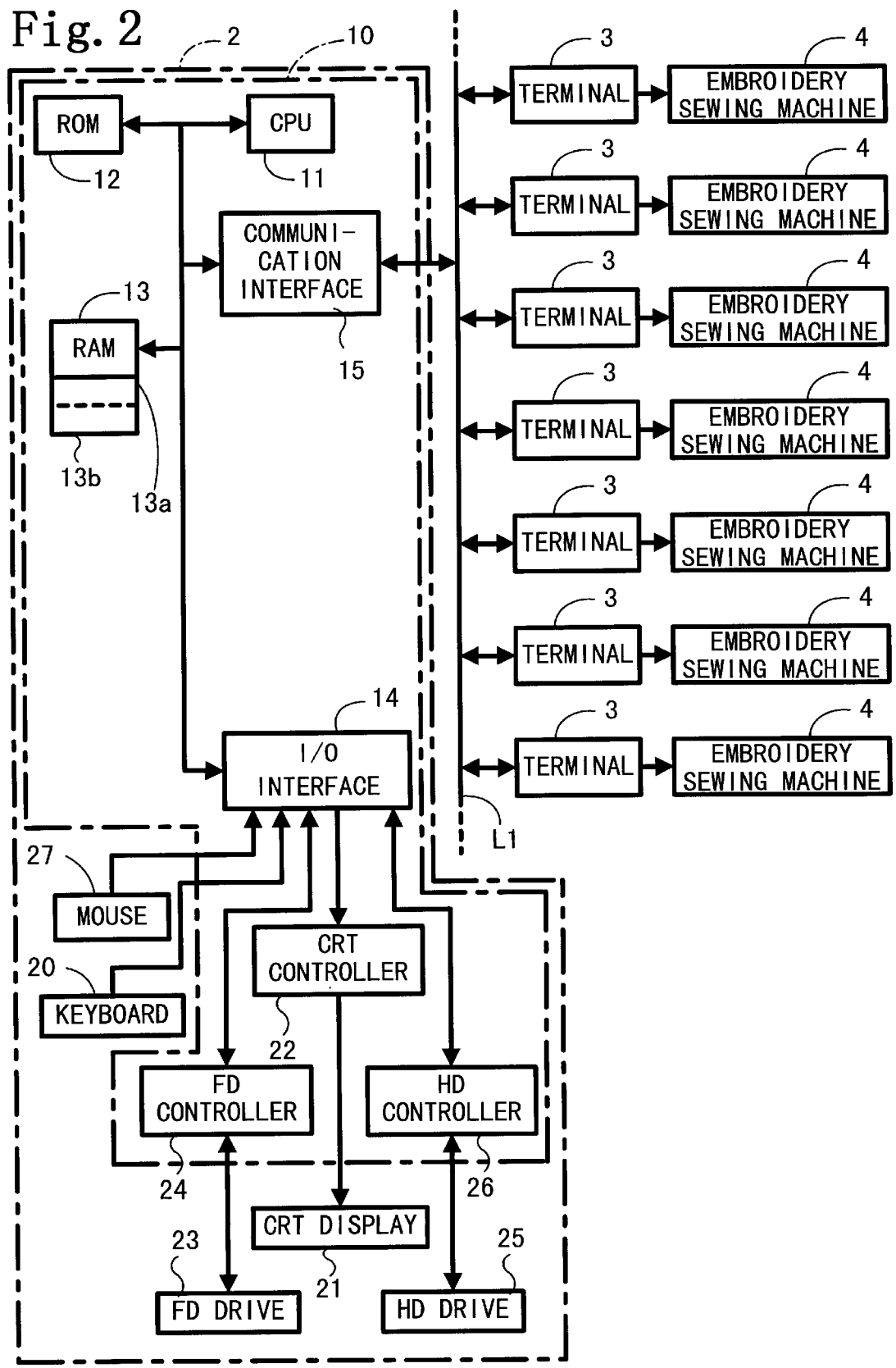

Fig. 3

| CATEGORY | GROUP NAME | EMBROIDERY SEWING MACHINE ID NO. |
|---|---|---|
| INSTALLATION SITE | WORKING GROUP A | MACHINE 2<br>MACHINE 3<br>MACHINE 4<br>MACHINE 5<br>. . . . |
| | WORKING GROUP B | MACHINE 7<br>MACHINE 8<br>. . . . |
| | USA PLANT | MACHINE 11<br>MACHINE 12<br>. . . . |
| | TOKYO PLANT | MACHINE 21<br>MACHINE 22<br>MACHINE 23<br>. . . . |
| | . . . . | . . . . |
| MODEL | BES-1210 | MACHINE 2<br>MACHINE 23<br>. . . . |
| | BES-1260 | MACHINE 3<br>MACHINE 13<br>MACHINE 15<br>. . . . |
| | BES-960 | MACHINE 1<br>MACHINE 4<br>MACHINE 6<br>MACHINE 7<br>. . . . |
| | BAS-411 | MACHINE 5<br>MACHINE 20<br>. . . . |
| | . . . . | . . . . |

28, 28a (installation site rows), 28b (model rows)

Fig. 6

| MACHINE NAME | DATA NAME | PROGRESS | OPERATOR | MODEL INFORMATION |
|---|---|---|---|---|
| + WORKING GROUP A | | | | |
| + WORKING GROUP B | | | | |
| + WORKING GROUP C | | | | |
| + USA PLANT | | | | |
| + SINGAPORE | | | | |
| + TOKYO PLANT | | | | |
| + HEAD PLANT | | | | |
| + KYUSHU PLANT | | | | |

Fig. 7

| MACHINE NAME | DATA NAME | PROGRESS | OPERATOR | MODEL INFORMATION |
|---|---|---|---|---|
| −WORKING GROUP A | | | | |
| MACHINE 2 | G021.DST | ▨▨▨□ | MR./MS. B | BES-1210 |
| MACHINE 3 | G031.DST | ▨▨▨▨□ | MR./MS. C | BES-1260 |
| MACHINE 4 | BARA.ECS | ▨▨□□ | MR./MS. D | BES-960 |
| MACHINE 5 | BASYA.ECS | ▨▨▨▨□ | MR./MS. E | BAS-411 |
| MACHINE 6 | TEST.DST | ▨▨▨□ | MR./MS. F | BES-960 |
| +WORKING GROUP B | | | | |
| +WORKING GROUP C | | | | |
| +USA PLANT | | | | |
| +SINGAPORE | | | | |
| +TOKYO PLANT | | | | |
| +HEAD PLANT | | | | |
| +KYUSHU PLANT | | | | |

Fig. 11

| ASSIGNED EMBROIDERY SEWING MACHINE | COMPUTER ALLOWED ACCESS TO THIS COMPUTER | COMPUTER TO BE ACCESSED BY THIS COMPUTER |
|---|---|---|
| MACHINE 30 | NONE | COMPUTER 2B |
| MACHINE 31 | | COMPUTER 2C |
| MACHINE 32 | | |
| ........ | | |

| ASSIGNED EMBROIDERY SEWING MACHINE | COMPUTER ALLOWED ACCESS TO THIS COMPUTER | COMPUTER TO BE ACCESSED BY THIS COMPUTER |
|---|---|---|
| MACHINE 10 | COMPUTER 2A | NONE |
| MACHINE 11 | | |
| MACHINE 12 | | |
| ........ | | |

128B

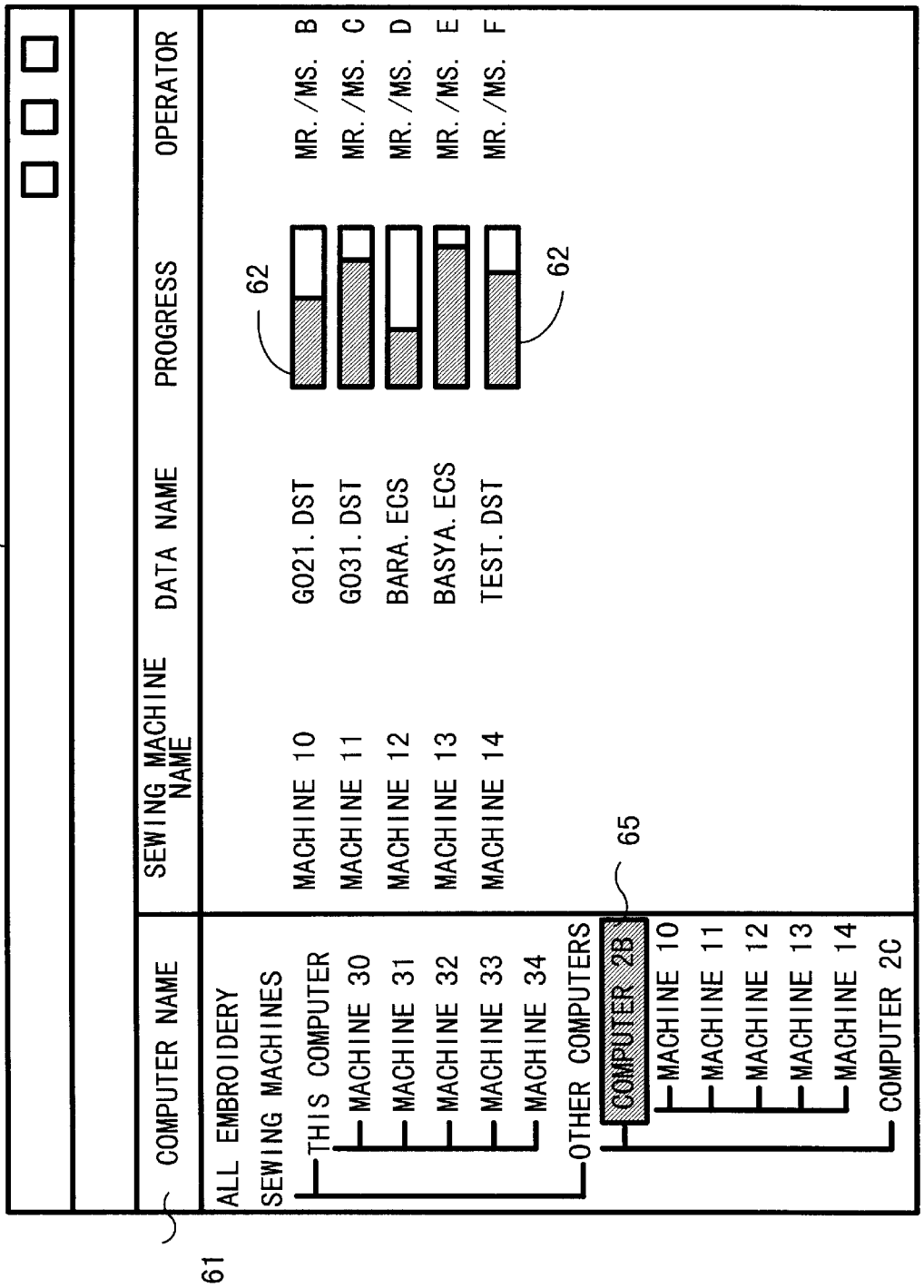

SEWING APPARATUS MANAGEMENT SYSTEM

BACKGROUND OF THE INVENTION

1. Field of Invention

The invention relates to a sewing apparatus management system for collectively managing a plurality of sewing apparatuses, such as an embroidery sewing machine and an embroidery data processing apparatus, via a network.

2. Description of Related Art

Conventionally, a sewing apparatus, such as an embroidery sewing machine and an embroidery data processing apparatus, includes a control unit similar to a general personal computer to control operations of the sewing apparatus. At a sewing plant where products are manufactured using a plurality of embroidery sewing machines or embroidery data processing apparatuses, in order to manage the entire plant, the terminal of each embroidery sewing machine or embroidery data processing apparatus is connected to a management computer via a network line. Therefore, the embroidery sewing machines or the embroidery data processing apparatuses are collectively managed. Each embroidery sewing machine performs a sewing operation to form an embroidery pattern and the embroidery data processing apparatus creates data for an embroidery pattern. The operations that can be performed on the embroidery sewing machine and the embroidery data processing apparatus are different. However, there is no difference in the invention even when either one is used, so that hereinafter the embroidery sewing machine will be described.

Conventionally, in a management system for the embroidery sewing machines networked as described above, a supervisor generally performs operations by observing information displayed on a display of the management computer sent from each embroidery sewing machine. The information for each embroidery sewing machine includes, for example, an installation site of the embroidery sewing machine, a model, an operating condition, an embroidery pattern name being sewn, and an operator's name. There are various kinds of embroidery patterns. For example, there are small embroidery patterns, such as a patch and a mark on a cap, and large embroidery patterns, such as those formed on a back of a jacket or on a short split curtain. Further, there are continuous embroidery patterns formed on a fabric before cutting or sewing and single embroidery patterns formed on a work cloth after cutting or sewing. Therefore, conditions for management, such as a turnaround time of embroidering and the size of the embroidery pattern, vary with the embroidery pattern.

At a small plant, the number of the embroidery sewing machines is relatively small, and the number of kinds of the embroidery patterns ordered by the plant is also small. Therefore, the embroidery sewing machines can be easily managed. However, as the scale of the plant becomes large, the installation sites of the embroidery sewing machines are spread out in the plant and the number of kinds of the embroidery patterns ordered by the plant increases. Therefore, it is important to network the embroidery sewing machines. The supervisor assigns operations for embroidering a newly-ordered embroidery pattern to each embroidery sewing machine, and sends the embroidery data to be used in each embroidery sewing machine using the management computer. Wasted operations at the entire plant can be eliminated by such that the supervisor supplies materials and products as necessary in accordance with work progress, manages the operations so that the work is provided evenly to all operators, and speedily takes countermeasures toward the embroidery sewing machines when an abnormal condition occurs. Therefore, operating efficiency can be increased.

However, in the conventional management system, as the number of embroidery sewing machines to be managed increases, the amount of information to be displayed on the display of the management computer also increases. Accordingly, it is difficult to manage all the embroidery sewing machines at the same time. There may also be cases where the plants to be managed are spread out in all parts of the world. In this case, the number of embroidery sewing machines becomes enormous, so that the management of all the embroidery sewing machines becomes more difficult. In particular, it is serious when the information sent from all the embroidery sewing machines cannot be displayed in a frame on the display. In order to obtain the information of all the embroidery sewing machines, the supervisor has to scroll the information on the screen and interchange the pieces of the information. As a result, the supervisor gets tired, or confused, and may miss important information. Information of the desired embroidery sewing machine can be displayed by searching the information under certain criteria. However, a key operation, such as inputting new criteria every time searching criteria change is required causes the management operation to become troublesome and time is wasted.

On the other hand, as the number of the embroidery sewing machines to be managed further increases, the amount of data collected in the management computer becomes extremely large. Therefore, the amount of data may exceed the capacity of the computer. In order to address this problem, a method is conceivable in which the number of the embroidery sewing machines to be managed by one management computer is reduced by using a plurality of management computers. However, if the number of the management computers is increased, the management is spread over many places. Accordingly, collective management becomes difficult. When the management computers are spread out in all parts of the world, data exchanged between the management computers may be mixed. Therefore, the collective management of the whole management system becomes more difficult.

SUMMARY OF THE INVENTION

In view of the foregoing problems, the invention provides a sewing apparatus management system that can manage a plurality of sewing apparatuses via a network with improved efficiency. In the sewing apparatus management system, one or more management computers are used to manage the plurality of sewing apparatuses.

According to one preferred embodiment of the invention, a sewing apparatus management system may include a plurality of sewing apparatuses; a plurality of terminals are provided, each corresponding to a one of the plurality of sewing apparatuses; and a management computer connected to the plurality of terminals via a network to manage the plurality of sewing apparatuses, various management information for the plurality of sewing apparatuses being transmitted from the plurality of terminals to the management computer; wherein the management computer comprises a classification information storage device to store classification information obtained by identifying the plurality of sewing apparatuses and classifying the same into a plurality of groups according to a category; and a managing device that selectively manages, when one of the plurality of groups is selected on the management computer, at least one sewing apparatus belonging to the selected group.

With this configuration, the management computer manages the plurality of sewing apparatuses based on the management information transmitted from the plurality of terminals. Upon a selection of one of the plurality of groups, the management computer handles the management information associated only with the selected group and selectively manages a part of the plurality of sewing apparatuses. Accordingly, the management computer handles, at any one time, a limited number of sewing apparatuses and a lesser amount of management information and, as a result, takes a shorter time to identify relevant sewing apparatuses and process relevant management information. Thus, the plurality of sewing apparatuses can be managed with improved efficiency, each serving apparatus, for example, including an embroidery sewing machine and an embroidery data processing apparatus.

According to another preferred embodiment of the invention, a sewing apparatus management system may include a plurality of sewing apparatuses; a plurality of terminals each provided corresponding to each of the plurality of sewing apparatuses; and a management computer connected to the plurality of terminals via a network to manage the plurality of sewing apparatuses, various management information on the plurality of sewing apparatuses being transmitted from the plurality of terminals to the management computer, wherein the management computer may include: a display device; an input device; a classification information storage device to previously store classification information obtained by identifying the plurality of sewing apparatuses and classifying the same into a plurality of groups according to a category; and a display controller that selectively displays, when one of the plurality of groups is selected on the management computer using the input device, the various management information on at least one management apparatus belonging to the selected group.

With this configuration, the management computer manages the plurality of sewing apparatuses based on the management information transmitted from the plurality of terminals and displayed on the display device. Upon a selection of one of the plurality of groups by a supervisor, using the input device, the management information associated only with the selected group is selectively displayed on the display device. Accordingly, the display device of the management computer displays a lesser amount of the management information at any one time, and allows the supervisor to search the displayed management information for specific management information in a shorter time. Thus, the plurality of sewing apparatuses can be managed with improved efficiency.

Further, the sewing apparatus management system may preferably include a transmission control device that selectively transmits instruction information inputted from the input device on the management computer to at least one terminal of the at least one sewing apparatus belonging to the selected group.

With this configuration, the management computer transmits the instruction information, inputted by the supervisor using the input device, selectively to the terminals of the sewing apparatuses belonging to the selected group. The management computer takes a shorter time to identify the destination terminals from among the plurality of terminals and transmits the instruction information to the destination terminals quickly. The management information and the instruction information can be exchanged efficiently between the management computer and the terminals of the relevant sewing apparatuses. Thus, the plurality of sewing apparatuses can be managed with improved efficiency.

Further, the sewing apparatus management system may preferably include a category setting device that sets the category to be used for classifying the plurality of sewing apparatuses on the classification information storage device.

With this configuration, the category setting device allows the supervisor to arbitrarily set the category used for classifying the plurality of sewing apparatuses into groups. Thus, the plurality of sewing devices can be managed, as required by the supervisor, with improved efficiency.

Further, the management information may preferably include work progress information on the plurality of sewing apparatuses, and the management computer comprises a progress display device that allows the display device to display the work progress information in a predetermined format.

With this configuration, the work progress information of the relevant sewing apparatuses is displayed as part of the management information on the display device of the management computer. This allows the supervisor to easily check the progress of work performed by the relevant sewing apparatuses. Thus, the plurality of sewing apparatuses can be managed with improved efficiency.

Further, the management information may preferably include embroidery data necessary for work performed by the plurality of sewing apparatuses, and the management computer comprises an embroidery data display device that allows the display device to display the embroidery data in a predetermined format and an embroidery data setting device that arbitrarily sets the contents of the embroidery data.

With this configuration, embroidery data for the relevant sewing apparatuses are displayed for the supervisor. In addition, the embroidery data setting device allows the supervisor to arbitrarily set the contents of the embroidery data. The embroidery data used for the plurality of sewing apparatuses can be set as required by the supervisor. Thus, the plurality of sewing apparatuses can be managed with improved efficiency.

Further, the sewing apparatus management system may preferably include a display item setting device that arbitrarily sets an item of the management information displayed on the display device.

With this configuration, the display item setting device allows the supervisor to arbitrarily set the management information item displayed on the display device. Accordingly, only the management information item required by the supervisor is displayed. Thus, the plurality of sewing apparatuses can be managed with improved efficiency.

According to another preferred embodiment of the invention, a sewing apparatus management system comprising a plurality of sewing apparatuses; a plurality of terminals each provided corresponding to each of the plurality of sewing apparatuses; and a plurality of management computers each connected to the plurality of terminals via a network to cooperatively manage the plurality of sewing apparatuses, management information for the plurality of sewing apparatuses being transmitted from the plurality of terminals to the plurality of management computers, wherein each of the plurality of management computers is accessible to at least one terminal of at least one sewing apparatus assigned thereto to manage the at least one sewing apparatus, and a specific management computer among the plurality of management computers is authorized to gain access to other unspecific management computers and to terminals of sewing apparatuses assigned to the other unspecific management computers.

With this configuration, each of the plurality of management computers cooperatively manages the sewing apparatuses assigned thereto, based on the management information transmitted from the corresponding terminals. When the specific management computer gains access to the other unspecific management computers, the management information on the sewing apparatuses assigned to the other unspecific management computers is transmitted to the specific management computer. Normally, the plurality of sewing apparatuses are managed cooperatively by the corresponding management computers, and all the sewing apparatus are collectively managed, when needed, by the specific management computer. Accordingly, the specific management computer handles, as one of the plurality of management computers, a limited amount of management information during normal management and, when needed, performs centralized management of all the sewing apparatuses. Thus, the plurality of sewing apparatuses are managed via the network with improved efficiency, each sewing apparatus including an embroidery sewing machine and an embroidery data processing apparatus.

Further, each of the plurality of management computers may preferably include a display device, an input device, and a limited display control device that limitedly displays, in response to an operation of the input device, the management information received from only the at least one accessible terminal, and the specific management computer may include a privileged display control device that privilegedly displays, in response to an operation of the input device, the various management information received, by authorized access, from the other unspecific management computers and from the terminals of the sewing apparatuses assigned to the other unspecific management computers.

With this configuration, normal management is performed cooperatively by the plurality of management computers, while centralized management is performed by the specific management computer, which is included among the plurality of management computers. Such collective management does not increase the amount of management information displayed on the display device of the specific management computer. The amount of management information displayed at any one time is reduced on the display devices of both the specific and the unspecific management computers. Thus, the plurality of sewing apparatuses are managed via the network with improved efficiency.

Further, the sewing apparatus management system may preferably include an assignment setting device that arbitrarily sets assignments of the plurality of sewing apparatuses to the plurality of management computers.

With this configuration, the assignment setting device allows the supervisor to arbitrarily and desirably set assignments of the plurality of sewing apparatuses. Thus, the management efficiency can be further improved.

Further, the various management information may preferably include work progress information for the plurality of sewing apparatuses, and each of the management computers comprises a progress display device that allows the display device to display the work progress information in a predetermined format.

With this configuration, the work progress information of the relevant sewing apparatuses is displayed, as part of the management information, on the display device of each of the management computers. This allows the supervisor to easily check the progress of work performed by the relevant sewing apparatuses. Thus, the management efficiency is further improved.

Further, the management information may preferably include embroidery data necessary for the work to be performed by the plurality of sewing apparatuses, and each of the management computers comprises an embroidery data display device that allows the display device to display the embroidery data in a predetermined format and an embroidery data setting device that arbitrarily sets the contents of the embroidery data.

With this configuration, embroidery data for the relevant sewing apparatuses are displayed for the supervisor, as part of the management information, on the display device of each of the management computers. In addition, the embroidery data setting device allows the supervisor to arbitrarily set the contents of the embroidery data. The embroidery data used for the plurality of the sewing apparatuses can be set as required by the supervisor. Thus, the management efficiency can be further improved.

Further, the sewing apparatus management system may preferably include a display item setting device that arbitrarily sets an item of the various management information displayed on the display device.

With this configuration, the display item setting device allows the supervisor to arbitrarily set the management information item displayed on the display device of each of the management computers. Accordingly, the management information item displayed on the display device can be set according to the work desired to be managed by the supervisor. Thus, the management efficiency can be further improved.

BRIEF DESCRIPTION OF THE DRAWINGS

The invention will be described in greater detail with reference to preferred embodiments thereof and the accompanying drawings wherein:

FIG. 2 is a block diagram showing an electrical structure of a management computer in the first embodiment;

FIG. 3 is a conceptual illustration showing a classification table in the first embodiment;

FIG. 6 is an explanatory diagram showing a screen of a display in the first embodiment;

FIG. 7 is an explanatory diagram showing the screen of the display in the first embodiment;

FIG. 11 is a conceptual illustration showing an example of a setting table in the second embodiment;

FIG. 12 is a conceptual illustration showing an example of another setting table in the second embodiment;

FIG. 16 is an explanatory diagram showing the screen of the second embodiment.

DETAILED DESCRIPTION OF PREFERRED EMBODIMENTS

Figure 1:
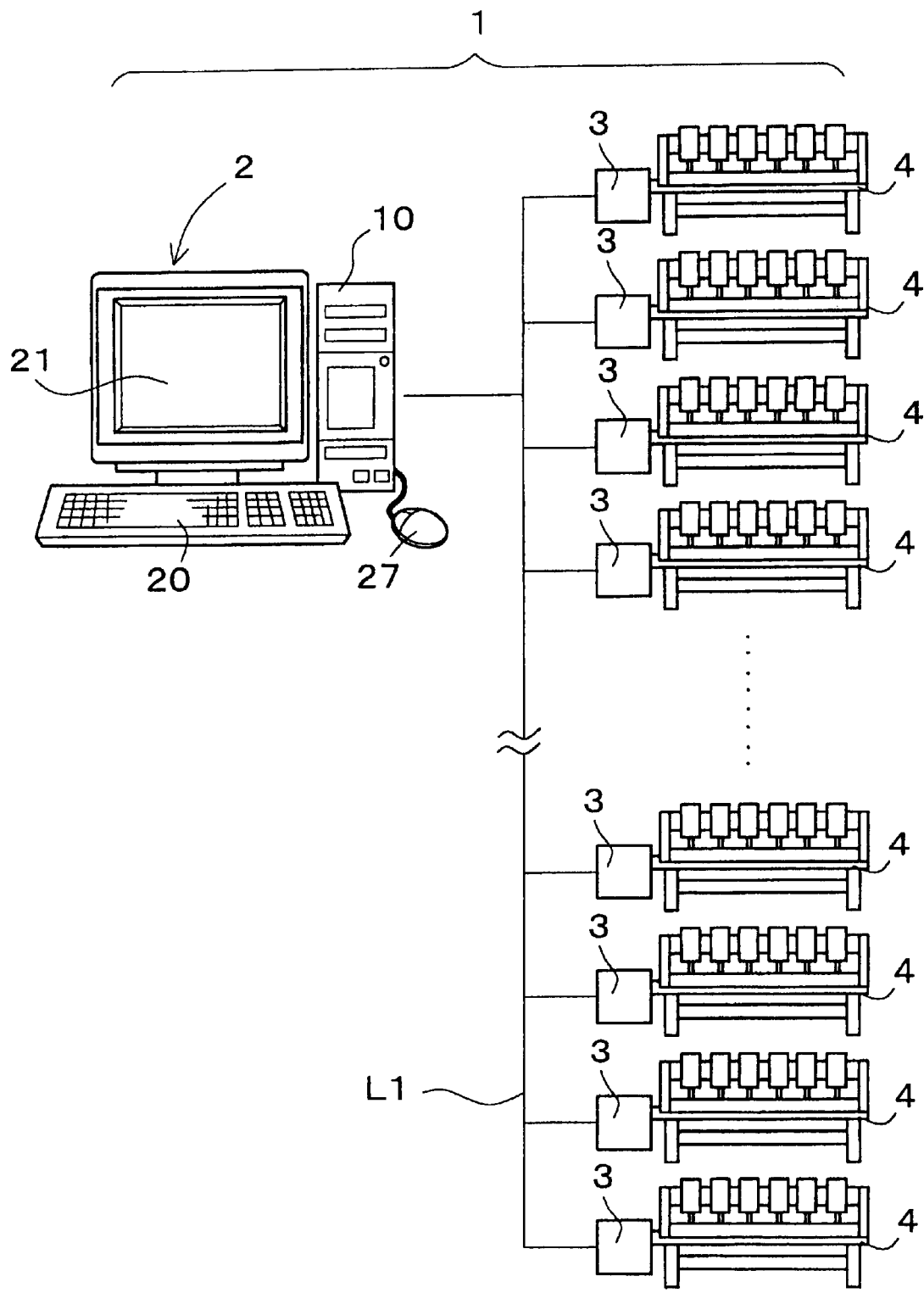
FIG. 1 is a conceptual illustration showing a structure of a sewing apparatus management system in a first embodiment.

A first embodiment of a sewing apparatus management system of the invention will be described. FIG. 1 is a conceptual illustration showing a structure of the sewing apparatus management system of the first embodiment.

As shown in FIG. 1, the management system 1 includes a management computer 2, a plurality of terminals 3 connected to the management computer 2 via a network line L1, embroidery sewing machines 4, as the sewing apparatus, individually connected to each terminal 3. As shown in FIG. 1, each embroidery sewing machine 4 is a six-head embroidery sewing machine which is provided with six sewing machines arranged in parallel. The embroidery sewing machine 4 can simultaneously form the same embroidery pattern on six work clothes, each held by a cloth holder frame attached to a moving frame.

The management computer 2 is a general computer that includes a main controller 10 that controls the management computer 2, a keyboard 20 and a mouse 27 that are inputting devices, and, in this example, a CRT display 21 that is a displaying device. Other display devices, such as flat screen, can also be used.

FIG. 2 is a block diagram showing the electrical structure of the management computer 2. The main controller 10 includes a CPU 11, a ROM 12, a RAM 13, an I/O interface 14 and a communication interface 15 that are connected to each other via a bus. The I/O interface 14 is connected to a CRT controller 22 that inputs/outputs display data to the CRT display 21, a floppy disk controller (FD controller) 24 that drives and controls a floppy disk drive (FD drive 23) and a hard disk controller (HD controller) 26 that drives and controls a hard disk drive (HD drive) 25. Further, the 110 interface 14 is connected to the keyboard 20 and the mouse 27 for inputting characters and symbols as an external device.

In this embodiment, the CRT controller 22 and the CRT display 21 function as a displaying device. The keyboard 20 and the mouse 27 function as an inputting device.

The communication interface 15 is connected to a network line L1 that may be a LAN line or a telephone line. The terminals 3 of the embroidery sewing machines 4 to be managed are connected to the network line L1. Therefore, data can be transmitted bidirectionally between the management computer 2 and each terminal 3.

The ROM 12 stores a start-up program for booting up the management computer 2 when power is turned on, like a general personal computer. The RAM 13 has a data memory 13a for storing various data, such as embroidery data, and an information memory 13b for temporarily storing information for classifying each embroidery sewing machine 4. The CPU 11 performs an operation to control the embroidery sewing machines 4 based on the program and the data.

A hard disk in the HD drive 25 stores various operating systems (OS), application programs, such as a control program for communication and word processing software, and a sewing apparatus management program. Further, the hard disk is provided with space for storing classification information for classifying each embroidery sewing machine 4 into a plurality of groups by predetermined categories. FIG. 3 shows a classification table 28 schematically showing the classification information. The classification table 28 includes three kinds of data, such as "Category", "Group name" and "Embroidery sewing machine identification number".

In FIG. 3, data contents are partially shown as an example of a classification table 28. As shown in an upper part 28a of the classification table 28 in FIG. 3, when "Installation site" is set as the "Category", the "Group name" includes, for example, "Working group A", "Working group B" and "USA plant". "Working group A" includes the embroidery sewing machines 4 that are identified, such as "Machine 2" and "Machine 3", as the "Embroidery sewing machine identification number". As shown in a middle part 28b in FIG. 3, when "Model" is set as the "Category", the "Group name" includes, for example, "BES-1210" and "BES-1260". "BES-1210" includes the embroidery sewing machines 4 that are identified, such as the "Machine 2" and "Machine 23", as the "Embroidery sewing machine identification number". That is, in the classification table 28, the embroidery sewing machines 4 are classified into a plurality of groups by the predetermined categories and the identification number of the embroidery sewing machines 4 belonging to each group are sorted. The contents of the classification table 28 is read into the information memory 13b of the RAM 13 from the hard disk and used when the sewing apparatus management program is run.

In this embodiment, the hard disk storing the classification table 28, the HD drive 25 and the HD controller 26 function as a classification information storage device.

Figure 4:
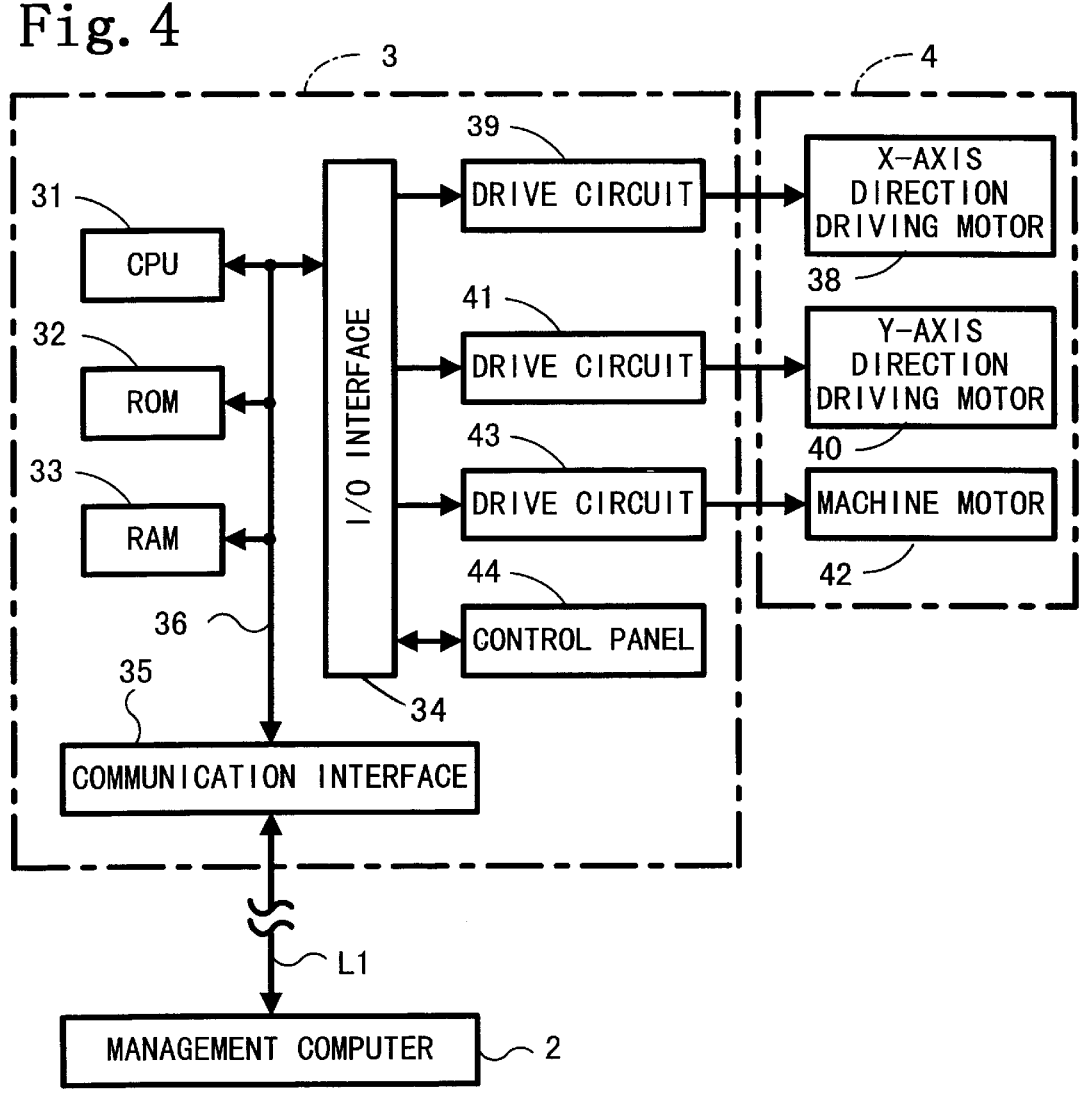
FIG. 4 is a block diagram showing an electrical structure of a terminal in the first embodiment.

Next, the electrical structure of the terminals 3, each connected to the respective embroidery sewing machines 4, will be described with reference to FIG. 4. The terminal 3 includes a CPU 31, a ROM 32 connected to the CPU 31 via a bus 36, such as an address bus, a RAM 33, an I/O interface 34 and a communication interface 35 connected to the management computer 2 via the network line L1.

The I/O interface 34 is connected to a drive circuit 39 for an X-axis direction moving motor 38 that moves an embroidery frame in an X direction (in a right and left direction), a drive circuit 41 for a Y-axis direction moving motor 40 that moves the embroidery frame in a Y direction (in a back and forth direction), a drive circuit 43 for a machine motor 42 that commonly drives a plurality of sewing machines provided to the embroidery sewing machine 4 and a control panel 44 provided with a small display, indication lamps and various switches. By controlling the X-axis direction moving motor 38, the Y-axis direction moving motor 40, and the machine motor 42 by the terminal 3, the embroidery frame holding a work cloth is moved in the back and forth and right and left directions and an embroidery pattern is formed on the work cloth by driving a needle and a presser foot.

The ROM 32 stores the control program for communication and other programs, including a control program for driving and controlling the motors 38, 40, 42 based on embroidery data sent from the management computer 2. The RAM 33 has a data memory for storing the embroidery data, other memory space and a buffer for temporarily storing various results of an operation implemented at the time of controlling the sewing operation.

Next, the sewing apparatus management program run in the main controller 10 of the management computer 2 will be described with reference to FIG. 5. The sewing apparatus management program is run to select management information that is required by the supervisor of the management computer 2 from the terminals 3 of the embroidery sewing machines 4 classified by the "Installation site" and to display the selected management information on the CRT display 21. The supervisor may send instructions to each terminal 3 as necessary.

Figure 5:
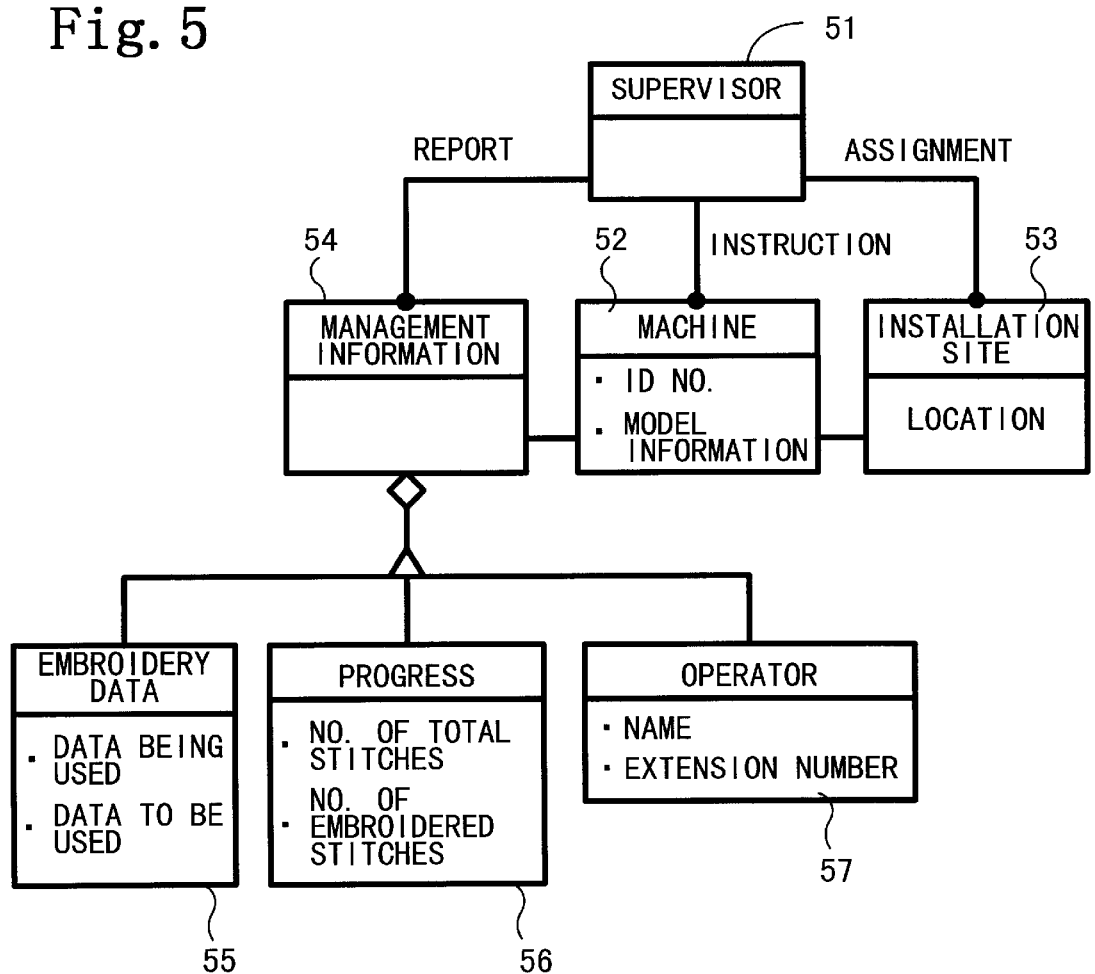
FIG. 5 is a diagram showing the sewing apparatus management system in the first embodiment.

In FIG. 5, each class is shown by a box, which is divided into an upper box and a lower box. The upper box represents a class name, and the lower box represents an attribute of the class. For example, a class "Sewing machine" 52 has "Identification number" and "Model information" as its attributes. A relationship between classes are indicated with straight lines. Related classes are indicated with symbols provided at an end of the straight lines. For example, "574" is provided to classes "Management information" 54, "Sewing Machine" 52 and "Installation site" 53. This means that a class "Supervisor" includes the classes "Management information" 54, "Machine" 52 and "Installation site" 53. Further, "◆" is provided to the class "Management information" 54. This means that classes "Embroidery data" 55, "Progress" 56 and "Operator" 57 are integrated into the class "Management information" 54.

As shown in FIG. 5, the class "Supervisor" 51 is a class that manages each embroidery sewing machine 4 which is an instance of the sewing machine 52. The class "Supervisor" 51 corresponds to the management computer 2 and the supervisor of the management computer 2. The class "Supervisor" 51 has a relationship with a plurality of machines 52, a plurality of installation sites 53 and a plurality of pieces of management information 54 as "Instruction", "Assignment" and "Report". This relationship means that the "Supervisor" 51 provides instructions to each sewing machine 52, assigns each installation site 53 of the embroidery sewing machines 4, and receives a report about the management information 54. Each sewing machine 52 also has a relationship with the installation sites 53 and the management information 54. Further, the class "Management information" 54 includes a class "Embroidery data" 55, a class "Progress" 56 and a class "Operator" 57. That is, the class "Embroidery data" 55 including "Data being used" and "Data to be used", the class "Progress" 56 including "Number of total stitches" and "Number of embroidered stitches", and the class "Operator" 57 including "Name" and "Extension number" are integrated into the class "Management information" 54. When there is other information, a sub-class may be added.

In the management computer 2, when the CPU 11 runs the sewing apparatus management program, a screen 60, as shown in FIG. 6, appears on the CRT display 21. In an item field 61, "Machine name", "Data name", "Progress", "Operator", and "Model information" are displayed in order from left to right. Under "Machine name", a location that is a property value of each instance of the installation site 53 shown in FIG. 5 is displayed (e.g., "working group A" and "working group B"). These are attributed to the "Group name" when "Installation site" is set as the "Category" displayed in the upper part 28a of the classification table 28 of FIG. 3. A symbol "+" given in front of each group name indicates that other information is included with the item.

When the supervisor who uses the management computer 2 manages a plurality of the embroidery sewing machines 4 that attributes to the "Working group A", the supervisor clicks "+" given to the left of the "Working group A", shown in FIG. 6, using the mouse 27. Therefore, the display on the screen 60 is changed to a display shown in FIG. 7. In FIG. 7, the symbol "+" given to the "Working group A" changes to "−". Under the each label "Machine name", "Data name", "Progress" and "Operator" in the item field 61, information related to the embroidery sewing machines 4 attributing to the "Working group A" is displayed. In FIG. 7, under the "Working group A", the machine names, such as the "Machine 2" and the "Machine 3", are displayed as the identification number for each embroidery sewing machine 4. Under the "Data name", the data names, such as "G021.DST" and "G031.DST", are displayed as data name of the embroidery data that is being used for the embroidering operation. Under the "Progress", progress bars 62 are displayed as a graph representing work progress. Under the "Operator", the operator names, such as "Mr./Ms. B" and "Mr./Ms. C", are to identify the person in charge of the operation. Under the "Model information", the model codes, such as "BES-1210" and "BES-1260", are displayed.

The progress bar 62 representing the work progress shows a proportion of the completed operation in real time using a bar graph. In the progress bar 62, a proportion of diagonally shaded area to a length of the bar graph shows a proportion of the currently completed operation to the entire embroidering operation.

Figure 8:
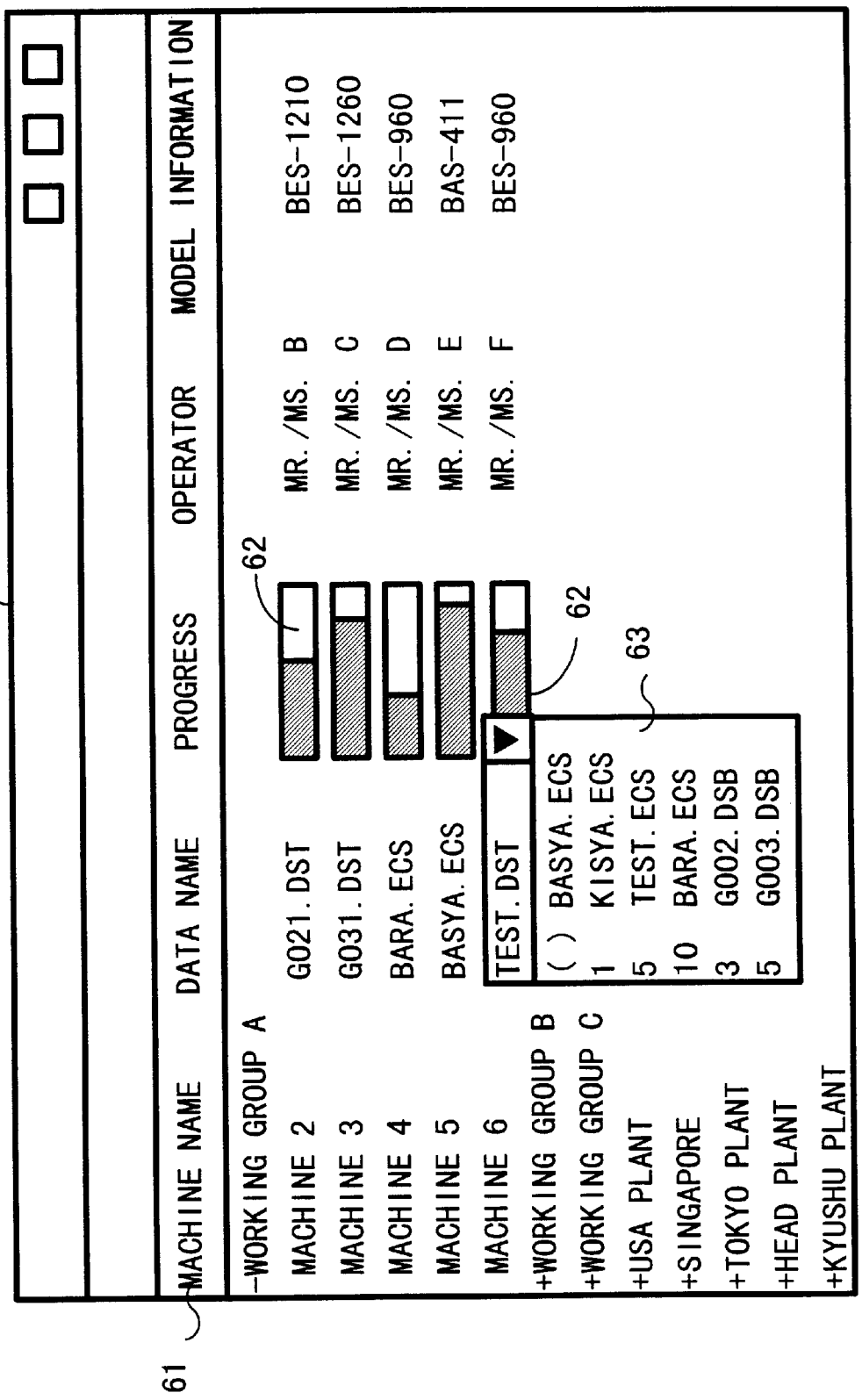
FIG. 8 is an explanatory diagram showing the screen of the display in the first embodiment.

In the screen 60, shown in FIG. 7, when the supervisor clicks the embroidery data corresponding to a specified embroidery sewing machine 4 under "Data name" using the mouse 27, a combo box 63 appears on the screen as shown in FIG. 8. In the combo box 63, names of the embroidery data to be used in the embroidery sewing machine 4 are displayed. That is, the data names, such as "BASHYA.ECS" and "KISHA.ECS", are displayed. In front of each data, a numeric value showing the number of repetitions to be performed are displayed. "( )" means that the operation is to be repeated until the operator stops the operation. The supervisor can send instruction information corresponding to the terminal 3 of the embroidery sewing machine 4 such that the supervisor instructs changing the number of repetitions or the operating sequence by selecting a specific content of data after determining the embroidering schedule from the contents of the data.

In FIGS. 6 to 8, "Machine name, "Data name", "Progress", "Operator", and "Model information" are set as the item name to be displayed on the screen 60. However, the supervisor may selectively change the item name to any name by instructing such using a menu bar (not shown).

For example, "Extension number" displayed in the box of the operator 57 in FIG. 5 may be displayed in the item field 61 on the screen 60 as the item name. Alternatively, in FIG. 5, when other information is added as a sub-class to the management information 54, the information may be displayed in the item field 61 of the screen 60.

In FIGS. 7 and 8, the progress bar 62 is used to represent the work progress. The displaying method may be changed by the supervisor by an instruction using the menu bar. For other displaying methods, for example, the proportion of the number of embroidered stitches to the number of total stitches may be expressed by a fraction or the remaining time required to complete the embroidering operation of the data currently being used may be displayed.

In the explanation described above, "Installation site" is used for classification as the category. However, the category may be changed. Further, a new classification method may be set and registered for supervisor's convenience.

For example, in the middle part 28b of the classification table 28 in FIG. 3, models attributing to "Group name" when the embroidery sewing machines 4 are classified by "Model"

as the category and the identification number attributing to "Embroidery sewing machine identification number" corresponding to each model. In this case, in FIG. 5, another class is formed using "Model information" attributing to the machine 52. When the supervisor selects "Model" as the category using such as the mouse 27, the CPU 11 of the management computer 2 stores the information in the middle part 28b of the classification table 28 in the RAM 13 as data when the sewing apparatus management program is run. The supervisor may set and register a new classification method by classifying each embroidery sewing machine 4 by a new category.

As described above, according to the management system 1 of the sewing apparatus of this embodiment, the management computer 2 manages the plurality of the embroidery sewing machines 4 based on various management information sent from each terminal 3. In the hard disk inserted in the HD drive 25 provided in the management computer 2, each embroidery sewing machine 4 is identified and is prestored as classification information that is classified into a plurality of groups by the predetermined categories. In the management computer 2, by selecting one of the plurality of the groups by the supervisor using such as the mouse 27, the embroidery sewing machines 4 attributed to the selected group are selected and are to be selected by the CPU 11. That is, the management computer 2 handles only the various management information according to the embroidery sewing machines 4 attributed to the selected group and, thus, some of the embroidery sewing machines 4 are selectively managed by the management computer 2. Therefore, the number of embroidery sewing machines 4 to be managed by the management computer 2 at any one time and the amount of management information becomes small and the time involved in specifying each embroidery sewing machine 4 and processing of the management information can be reduced. As a result, management efficiency for the plurality of the embroidery sewing machines 4 can be increased when managing the embroidery sewing machines 4 via the network line L1.

First, only classified group names are displayed on the screen 60 of the CRT display 21 of the management computer 2. The supervisor, by selecting one of the groups using the mouse 27, ensures only the management information of each embroidery sewing machine 4 attributed to the selected group are selectively displayed. Therefore, the amount of the management information to be displayed at one time on the CRT display 21 becomes small and the time involved in searching for specific management information from the management information to be displayed can be reduced. Therefore, the management efficiency of the embroidery sewing machines 4 can be improved.

The network line L1 is a two-way line. Therefore, the supervisor of the management computer 2 can not only obtain the management information from each embroidery sewing machine 4 but also send various instruction information to the terminals 3 of each embroidery sewing machine 4. The management computer 2 sends the instruction information to only the terminals 3 corresponding to the embroidery sewing machines 4 attributed to the selected group by the CPU 11 and the communication interface 15. Therefore, the time involved in specifying the terminals 3 to be sent the instruction information from the plurality of the terminals 3 can be reduced, so that the instruction information is speedily sent to the specific terminals 3. Consequently, the management efficiency of the embroidery sewing machines 4 is increased.

In the management computer 2, the supervisor can selectively set the category necessary for classifying each embroidery sewing machine 4 into groups. Therefore, a classification method that is convenient to manage the embroidery sewing machines 4 can be set. Accordingly, the embroidery sewing machines 4 can be classified into groups for the supervisor's convenience. Thus, the supervisor can easily select a suitable group to be managed and the management efficiency can be further increased.

On the CRT display 21 of the management computer 2, from the management information for each embroidery sewing machine 4, the information showing the work progress is displayed by the progress bar 62 in real time. That is, the information showing the work progress according to the specific embroidery sewing machines 4 is provided to the supervisor. Therefore, the supervisor can grasp the work progress at a glance by observing the CRT display 21. Accordingly, management efficiency can be further improved.

On the CRT display 21 of the management computer 2, from the management information of each embroidery sewing machine 4, as to the information about the embroidery data, only data being used for the embroidering operation are displayed. By the supervisor selecting the data using such as the mouse 27, the contents of the data to be used in the selected embroidery sewing machine 4 are displayed in the combo box 63. Therefore, the supervisor can grasp the future operations of the specified embroidery sewing machine 4 and instruct changes in the future operations to the embroidery sewing machine 4. Further, according to the CPU 11 of the management computer 2, the contents of the data to be displayed in the combo box 63 can be selectively set by the supervisor using such as the keyboard 20. Therefore, the embroidery data to be used in each embroidery sewing machine 4 can be set as necessary. Accordingly, management efficiency can be further increased.

In the management computer 2, the supervisor can selectively set the management information to be displayed on the CRT display 21. Therefore, only the management information required by the supervisor is displayed on the CRT display 21. That is, only the necessary information is displayed. Consequently, the management information is arranged so that the supervisor can easily observe the information.

Figure 9:
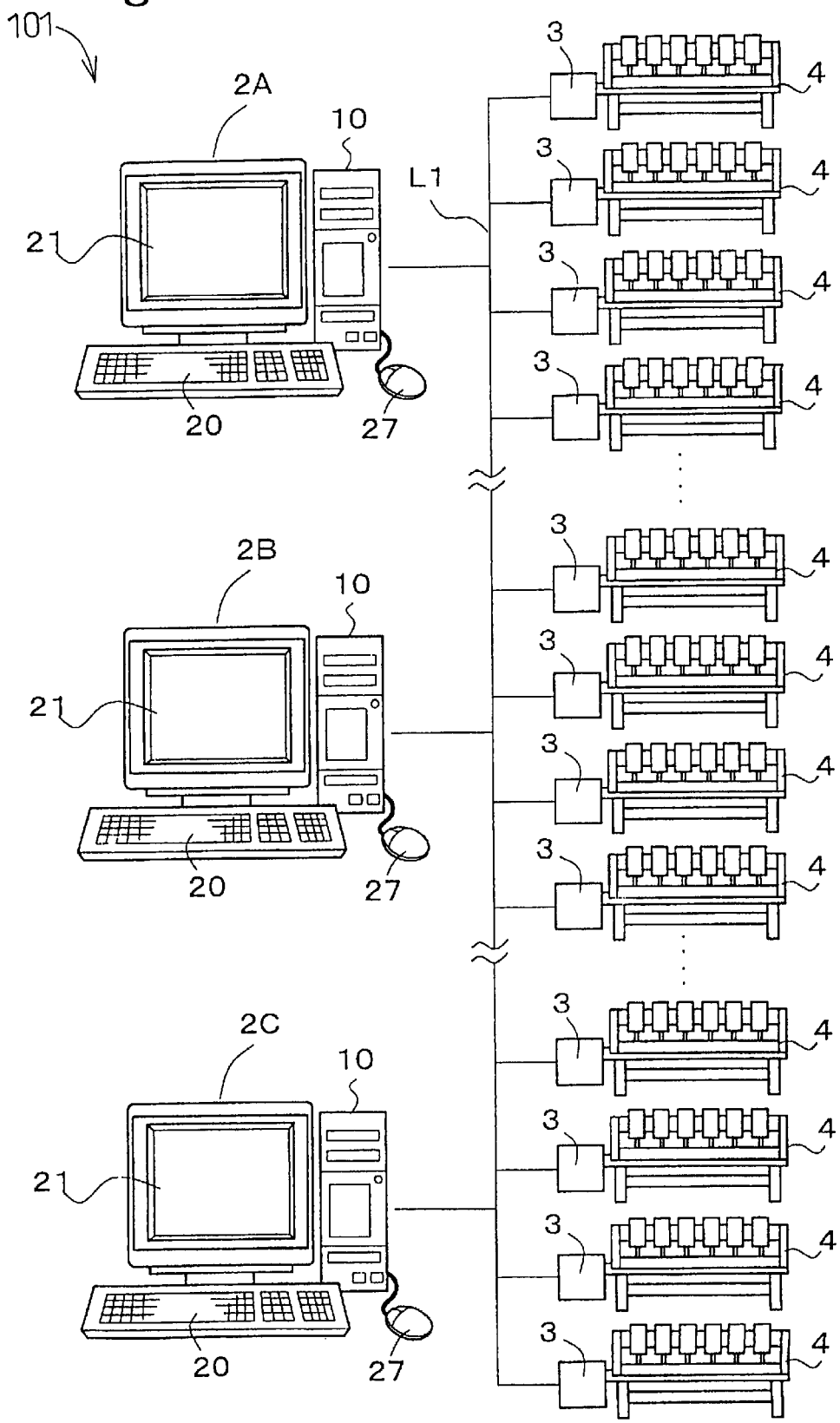
FIG. 9 is a conceptual illustration showing a sewing apparatus management system of a second embodiment.

Next, a second embodiment of a sewing apparatus management system of the invention will be described. FIG. 9 is a conceptual illustration showing a structure of the sewing apparatus management system of the second embodiment.

As shown in FIG. 9, a management system 101 of this embodiment includes management computers 2A, 2B, 2C connected to each other via a network line L1, a plurality of terminals 3 connected to each management computer 2A, 2B, 2C via the network line L1, embroidery sewing machines 4 as the sewing apparatus corresponding to each terminal 3. A plurality of the embroidery sewing machines 4 are shared among the management computers 2A, 2B, 2C and are managed by the respective management computers 2A, 2B, 2C. The management computer 2A functions as a specific management computer of the invention. The management computers 2B, 2C function as other management computers of the invention. Therefore, in the explanation provided below, the former is designated as the main management computer 2A and the latter are designated as sub-management computers 2B, 2C.

The main management computer 2A handles management information of the embroidery sewing machines 4 managed by the sub-management computers 2B, 2C, in addition to management information of the embroidery sewing machines 4 managed by itself. Therefore, the main management computer 2A manages the entire system. On the other hand, the sub-management computers 2B, 2C each manage only the management information of the embroidery sewing machines 4 managed by themselves.

The embroidery sewing machine 4 is a six-head embroidery sewing machine, which is the same machine as that used in the first embodiment. Each management computer 2A, 2B, 2C is a general computer including a main controller 10 controlling respective management computers 2A, 2B, 2C, a keyboard 20 and a mouse 27 that are an inputting device, and a display 21, in this example a CRT display.

Figure 10:
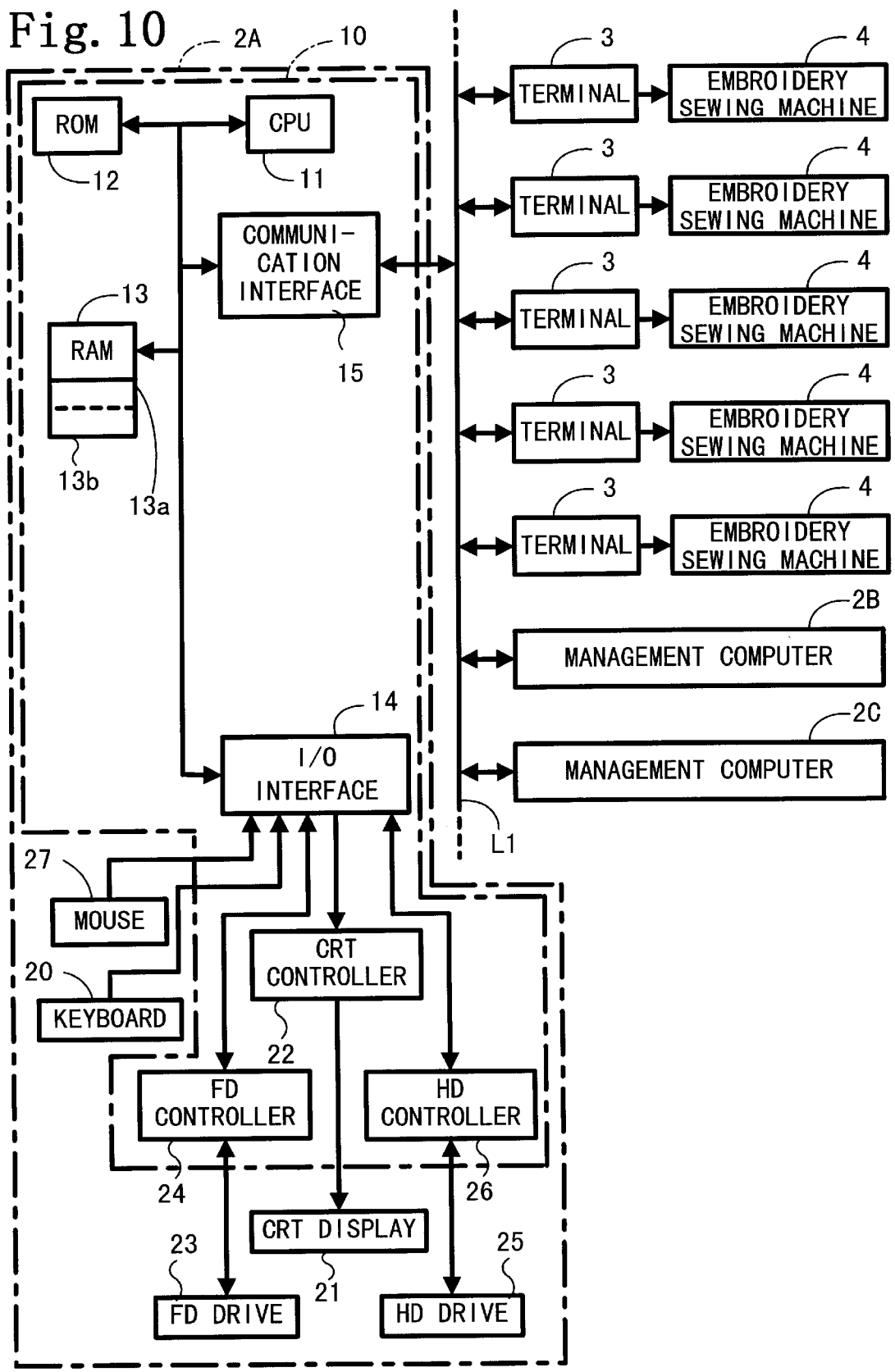
FIG. 10 is a block diagram showing a management computer of the second embodiment.

FIG. 10 is a block diagram showing an electrical structure for each management computer 2A, 2B, 2C. The management computers 2A, 2B, 2C have the same hardware, so that the main management computer 2A will representatively be described. The main controller 10 includes a CPU 11, a ROM 12, a RAM 13, an I/O interface 14 and a communication interface 15 that are connected to each other via a bus. The I/O interface 14 is connected to a CRT controller 22 that inputs/outputs display data to the CRT display 21, a floppy disk controller (FD controller) 24 that drives and controls a floppy disk drive (FD drive 23) and a hard disk controller (HD controller) 26 that drives and controls a hard disk drive (HD drive) 25. Further, the I/O interface 14 is connected to the keyboard 20 and the mouse 27 for inputting characters and symbols as an external device.

In this embodiment, the CRT controller 22 and the CRT display 21 function as a displaying device. The keyboard 20 and the mouse 27 function as an inputting device.

The communication interface 15 is connected to the network line L1 that includes a LAN line or a telephone line. The terminals 3 of the embroidery sewing machines 4 to be managed are connected to the network line L1. Therefore, data can be bidirecionally transmitted between each management computer 2A, 2B, 2C and the terminals 3.

The ROM 12 stores a start-up program for booting up the management computer 2A when power is turned on, like a general personal computer. The RAM 13 has data memory 13a for storing various data, such as embroidery data, and an information memory 13b for temporarily storing information for classifying each embroidery sewing machine 4. The CPU 11 performs an operation to control the embroidery sewing machines 4 based on the program and the data.

The communication interface 15 is connected to the network line L1, such as a LAN line or a telephone line. The terminals 3 corresponding to embroidery sewing machines 4 to be managed are connected to the network line L1. Therefore, data can be bidirectionally transmitted between each management computer 2A, 2B, 2C and terminals 3.

Stored in the hard disk of the HD drive 25 are various operation systems (OS), various application programs, such as a control program for communication and a word processor software, and a sewing apparatus management program. Further, space for storing management setting information including data, such as identification numbers of the terminals 3 corresponding to the embroidery sewing machines 4 managed by the main management computer 2A, computers that may be accessed by the main management computer 2A, and computers which can access the main management computer 2A, is provided by the hard disk.

FIG. 11 shows a setting table 128A schematically showing the management setting information of the main management computer 2A. The setting table 128A includes three items "Assigned embroidery sewing machine", "Computer allowed access to this computer" and "Computer to be accessed by this computer". The "Assigned embroidery sewing machine" includes such as "Machine 30", "Machine 31," and "Machine 32" as the identification number of each embroidery sewing machine 4 managed by the main management computer 2A. In the "Computer allowed access to this computer", no computer is set, that is, no computer is allowed access to the main management computer 2A. In the "Computer to be accessed by this computer", "Computer 2B" and "Computer 2C" are set as the computers to which the main management computer 2A has access. The main management computer 2A centrally manages the management system 101. Therefore, the main management computer 2A is allowed access to the sub-management computers 2B, 2C and prohibits the sub-management computers 2B, 2C from accessing the main management computer 2A.

In the main management computer 2A, the contents of the setting table 128A are read into the information memory 13b of the RAM 13 from the hard disk and used when the sewing apparatus management program is run. In this embodiment, the main controller 10, including the hard disk storing the setting table 128A, the HD drive 25 and the HD controller 26 function as an assignment setting device.

FIG. 12 shows a part of the contents of a setting table 128B stored in the hard disk of the sub-management computer 2B, as an example of the management setting information to be stored in the sub-management computers 2B, 2C. The contents of setting items of the setting table 128B are the same as those of the setting table 128A. As shown in FIG. 12, the "Assigned embroidery sewing machine" includes such as "Machine 10, "Machine 11" and "Machine 12" as the identification number of each embroidery sewing machine 4 managed by the sub-management computer 2B. In the "Computer allowed access to this computer", "Computer 2A" is set as the computer that is allowed access to the sub-management computer 2B. In the "Computer to be accessed by this computer", no computer is set, that is, the sub-management computer 2B is not allowed access to the other computers.

Contents of a setting table of the sub-management computer 2C are the same as that of the setting table 128B of the sub-management computer 2B, except for the identification number of the embroidery sewing machines 4.

Each terminal 3 connected to a embroidery sewing machine 4 has the same structure as the terminal 3 connected to the embroidery sewing machine 4 of the first embodiment. FIG. 5 shows a block diagram of the electrical structure of the terminals 3.

Next, the sewing apparatus management program run in the main controller 10 of each management computer 2A, 2B, 2C will be described. The sewing apparatus management program is used for selecting the management information required by the supervisor of each management computer 2A, 2B, 2C from the terminals 3 of the embroidery sewing machines 4 and for displaying the management information on the CRT display 21 of each management computer 2A, 2B, 2C. Further, for example, when the main management computer 2A is allowed access to the sub-management computers 2B, 2C, the management information possessed by the sub-management computers 2B, 2C is also displayed on the CRT display 21 of the main management computer 2A. Furthermore, the supervisor may send an instruction to each terminal 3 as necessary.

Figure 13:
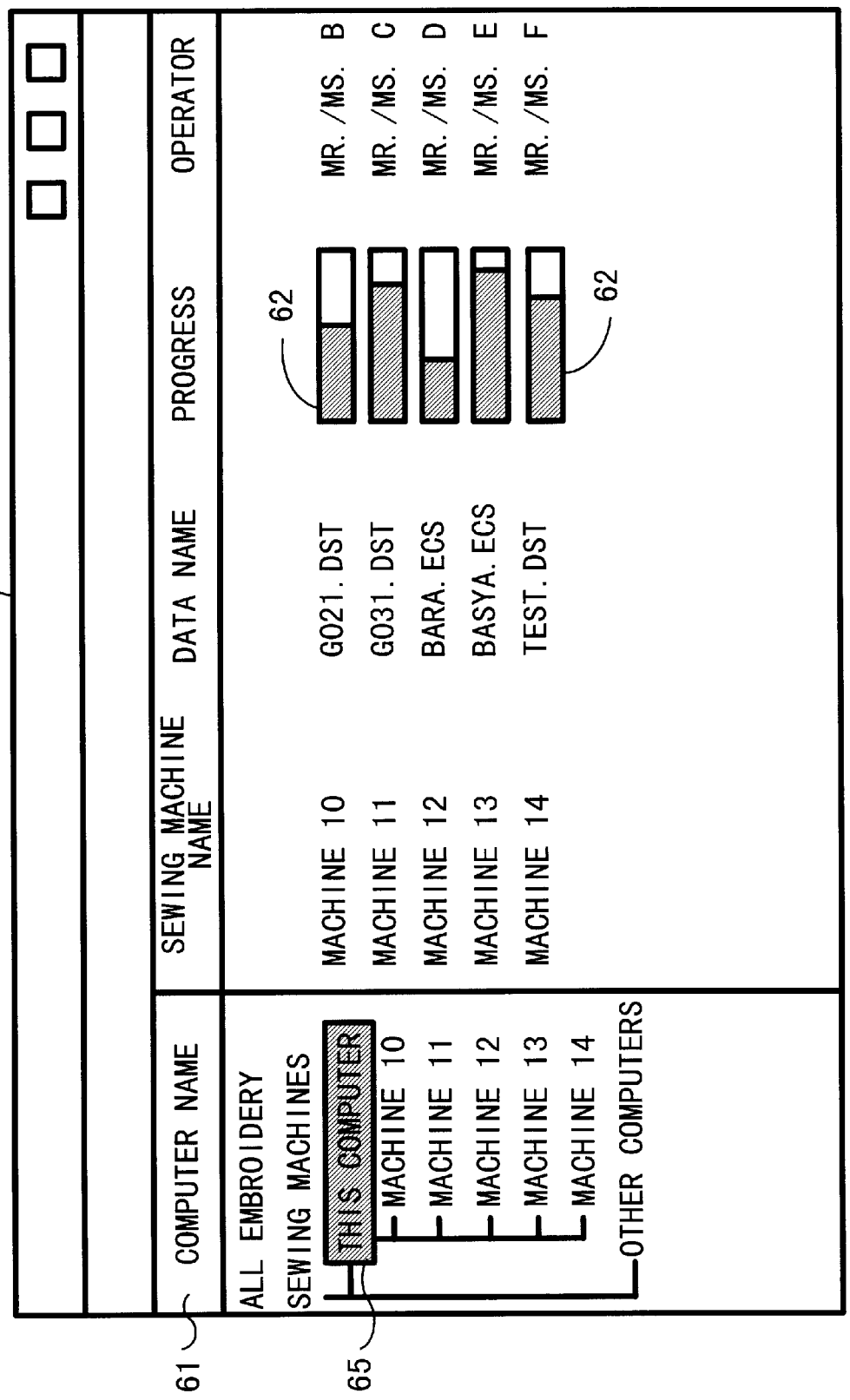
FIG. 13 is an explanatory diagram showing a screen of a display of the second embodiment.

The sub-management computer 2B, that does not perform the total management, will be described. As the sewing apparatus management program is run by the CPU 11 in the sub-management computer 2B, a screen 60 appears on the CRT display 21 as shown in FIG. 13. In an item field 61, "Computer name", "Sewing machine name", "Data name", "Progress" and "Operator" are displayed in order from left to right. Under the "Computer name", the identification numbers of each embroidery sewing machine 4 managed by the sub-management computer 2B are displayed so as to link to "This computer". In this case, the "This computer" is the sub-management computer 2B. Under "This computer", "Machine 10", "Machine 11", and "Machine 12" are displayed as the embroidery sewing machines 4 managed by the sub-management computer 2B. As shown in FIG. 12, the sub-management computer 2B cannot access any computers, so that no computer is displayed under "Other computer". The main controller 10 of the sub-management computer 2B used for performing such a display functions as a limited display control device.

In FIG. 13, as shown by a cursor 65, "This computer" is selected. Therefore, the identification numbers of each embroidery sewing machine 4 managed by the sub-management computer 2B are displayed under "Sewing Machine name", and data names, such as "G021.DST", "G031.DST", are displayed under the "Data" as the embroidery data being used for the sewing operation by each embroidery sewing machine 4. Under "Progress", progress bars 62 are displayed to represent work progress of each embroidery sewing machine 4. Under "Operator", operator names, such as "Mr./Ms. B" and "Mr./Ms. A", are displayed as the person in charge of the operation. The progress bar 62, representing the work progress, shows a proportion of the completed operation in real time using a bar graph. In the progress bar 62, a proportion of diagonally shaded area to a length of the bar graph shows a proportion of the currently completed operation to the whole embroidering operation.

Figure 14:
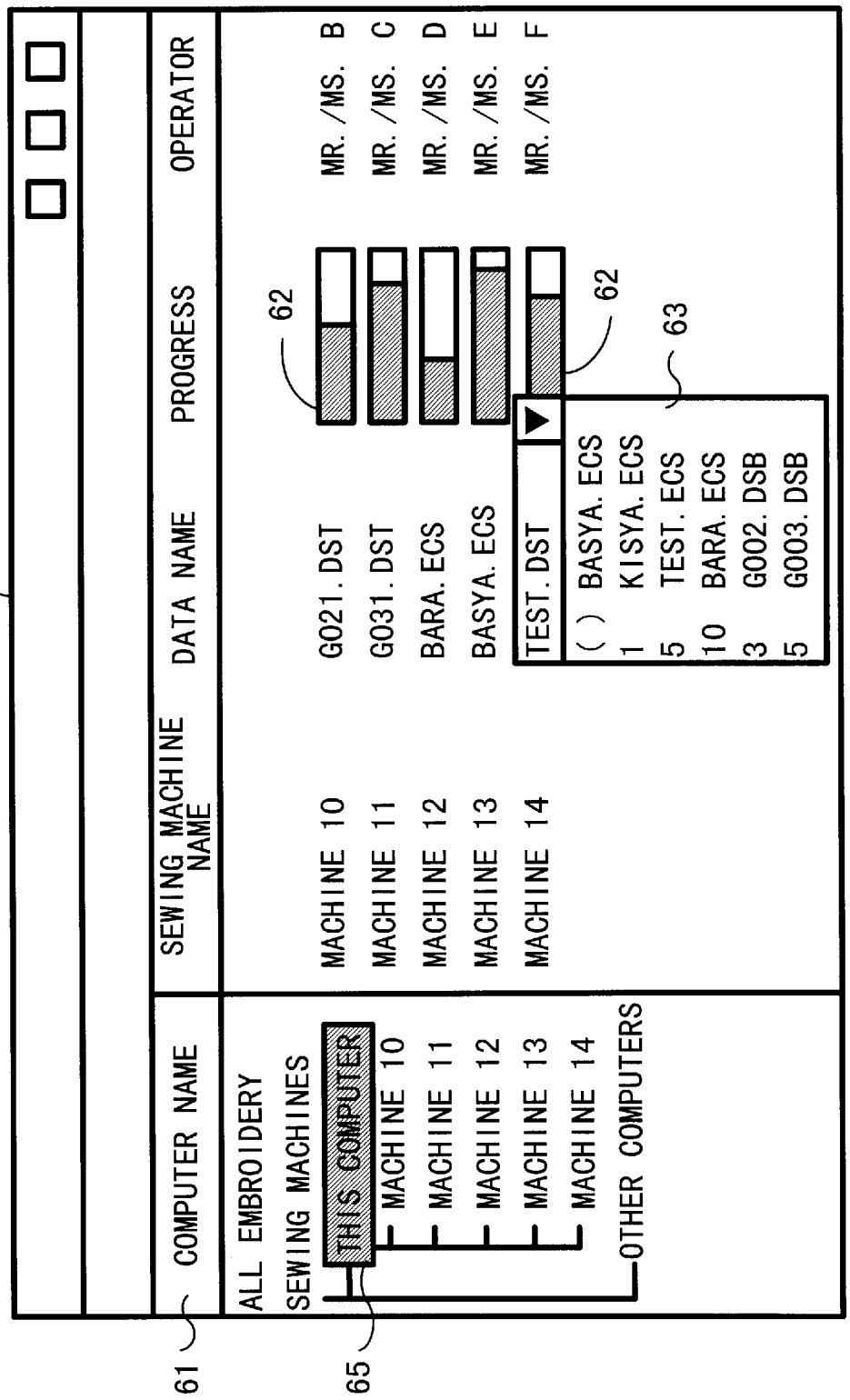
FIG. 14 is an explanatory diagram showing the screen of the display of the second embodiment.

In the screen 60 shown in FIG. 13, when the supervisor clicks the embroidery data corresponding to a specified embroidery sewing machine 4 under "Data name" using the mouse 27, a combo box 63 appears on the screen as shown in FIG. 14. In the combo box 63, names of embroidery data to be used in the embroidery sewing machine 4 are displayed. That is, the data names, such as "BASHYA.ECS" and "KISHA.ECS", are displayed. In front of each data is a numeric value showing the number of repetitions to be performed. "( )" means that the operation is to be repeated until the operator stops the operation. The supervisor can send instruction information to the terminal 3 of the embroidery sewing machine 4 such that the supervisor instructs a change in the number of repetitions or the operating sequence by selecting a specific content of data after determining the embroidering schedule from the contents of the data. In this embodiment, the main controller 10 used for displaying the combo box 63 functions as an embroidery data displaying device and the main controller 10 used for sending the instruction information functions as an embroidery data setting device.

When the sewing apparatus management program is run in the sub-management computer 2C, the same processing as that performed in the submanagement computer 2B is performed. That is, on the CRT display 21 of the sub-management computer 2C, the embroidery sewing machines 4 managed by the sub-management computer 2C and the management information according to the embroidery sewing machines 4 are displayed.

Figure 15:
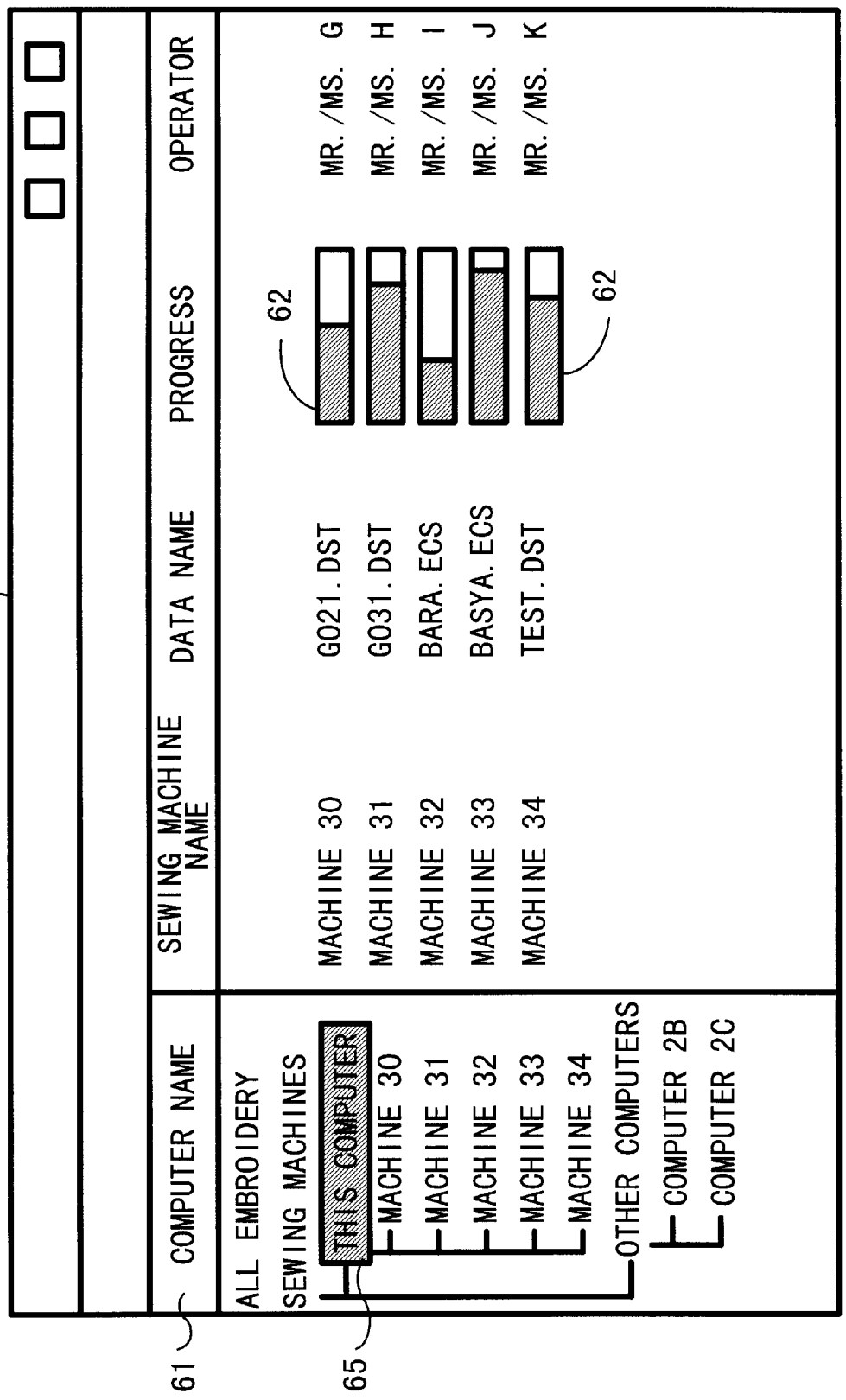
FIG. 15 is an explanatory diagram showing the screen of the second embodiment.

On the other hand, the main management computer 2A can totally manage embroidery sewing machines 4 managed by the sub-management computers 2B, 2C in addition to the embroidery sewing machines managed by the main management computer 2A. Therefore, as the CPU 11 in the main management computer 2A runs the sewing apparatus management program, the screen 60, as shown in FIG. 15, appears on the CRT display 21. As is the case with the screen 60 shown in FIG. 13, in the item field 61, "Computer name", "Sewing machine name", "Data name", "Progress", and "Operator" are displayed in order from left to right. In FIG. 15, "This computer" shown by the cursor 65 corresponds to the main management computer 2A. Under "This computer", the machine names, such as "Machine 30" and "Machine 31", are displayed as the embroidery sewing machines 4 managed by the main management computer 2A. As shown in FIG. 11, the main management computer 2A can access the "Computer 2B" and the "Computer 2C", so that "Computer 2B" and "Computer 2C" are displayed under "Other computers". Other display contents conform to the display contents of the screen 60 in FIG. 13.

In FIG. 15, as shown by the cursor 65, "This computer" is selected, so that the identification numbers of the embroidery sewing machines 4 managed by the main management computer 2A are displayed. By moving the cursor 65 over the computer name under "Other computers", various management information stored in the sub-management computers 2B, 2C that the main management computer 2A can access can be displayed on the screen 60.

For example, as shown in FIG. 16, as "Computer 2B" is selected by the cursor 65, the management information of embroidery sewing machines 4 managed by the sub-management computer 2B are displayed on the screen 60, instead of the contents of main management computer 2A displayed on the screen 60 in FIG. 15. In this embodiment, the main controller 10 of the main management computer 2A used for displaying the information described above functions as a privileged display control device.

In FIGS. 13 to 16, "Sewing machine name", "Data name", "Progress" and "Operator" are set as the item names to be displayed on the screen 60. However, these items can be selectively changed to any name by the supervisor using a menu bar (not shown). For example, an extension number of the operator or model of the embroidery sewing machine 4 can be displayed. The main controllers 10 of the management computers 2A, 2B, 2C, the keyboard 20 and the mouse 27 function as a display item setting device.

In FIGS. 13 and 16, the progress bar 62 is used to represent the work progress. The displaying method may be changed by using the menu bar by the supervisor. For other displaying methods, for example, the proportion of the number of embroidered stitches to the number of total stitches may be expressed by a fraction or the remaining time required to complete the embroidering operation of the data currently being used may be displayed.

Further, by changing the contents of the setting tables 128A, 128B, 128C, assignments of the embroidery sewing machines 4 managed by each management computer 2A, 2B, 2C or the access authority among the management computers 2A, 2B, 2C can be changed.

As described above, according to the management system 101 of the sewing apparatus, each management computer 2A, 2B, 2C is connected to the terminals 3 of each embroidery sewing machine 4 via the network line L1, and each embroidery sewing machine 4 is assigned and managed by the supervisor of one of the management computers 2A, 2B, 2C. Further, the hard disk of the HD drive 25 of each management computer 2A, 2B, 2C, stores the setting tables 128A, 128B, 128C as shown in FIGS. 12 and 13. When the sewing apparatus management program is run in the submanagement computers 2B, 2C, each sub-management computer 2B, 2C handles only the management information of the embroidery sewing machines 4 managed by the management computers 2B, 2C based on the contents of the respective setting tables 128B, 128C. On the other hand, the main management computer 2A usually manages only the assigned embroidery sewing machines 4. However, as necessary, the main management computer 2A can manage the embroidery sewing machines 4 managed by the sub-management computers 2B, 2C. Therefore, the amount of the management information usually handled by the main management computer 2A can be reduced and the management of all the embroidery sewing machines 4 can be smoothly performed using the management computers 2A, 2B, 2C. Consequently, management efficiency can be increased by which the plurality of the embroidery sewing machines 4 are managed via the network line L1 using the management computers 2A, 2B, 2C.

On the screen 60 of the CRT display 21 of each management computer 2A, 2B, 2C, first, only the machine names of embroidery sewing machines 4 managed by each management computer 2A, 2B, 2C and the management information according to the embroidery sewing machines 4 is displayed. In the main management computer 2A, first, the computer names, such as "Computer 2B" and "Computer 2C", are displayed on the screen 60 as the other computers. When the supervisor selects the computer name using the mouse 27, the management information for each embroidery sewing machine 4 managed by the selected submanagement computer 2B, 2C is displayed on the screen 60. Therefore, the supervisor of the main management computer 2A can manage all the embroidery sewing machines 4 as necessary, so that management efficiency can be increased.

The supervisor can selectively set the embroidery sewing machines 4 to be managed by the management computers 2A, 2B, 2C by changing the contents of the setting tables 128A, 128b, 128C. Therefore, the embroidery sewing machines 4 to be managed by each of the management computers 2A, 2B, 2C can be changed and set at the supervisor's convenience. Consequently, management efficiency can be further increased.

The information about the work progress of the management information according to each embroidery sewing machine 4 is displayed by the progress bar 62 in real time. Therefore, the supervisor can grasp the work progress on individual embroidery sewing machines 4 at a glance. Consequently, management efficiency is further increased.

As to the information about the embroidery data of the management information according to the embroidery sewing machine 4, first, the data name that is being used for the sewing operation is displayed. By selecting the data name by the supervisor using the mouse 27, the data name to be used later on the embroidery sewing machine 4 is displayed in the combo box 63. Therefore, the supervisor can grasp the future operations of the specified embroidery sewing machine 4 and provide instruction changes in the future operations to the embroidery sewing machine 4. Consequently, management efficiency is again further increased.

The items of the management information to be displayed on the screen 60 can be selectively set by the supervisor, so that only the necessary information can be displayed. Therefore, the display information can be set so that the supervisor can easily observe the information. Consequently, management efficiency is further increased.

It is to be understood that the invention is not restricted to the particular forms shown in the foregoing embodiments. Various modifications and alterations can be made thereto without departing from the scope of the invention. For example, the first and second embodiments have been described using the embroidery sewing machine 4 and terminal 3. However, an embroidery data processor or a conventional pattern sewing machine may be used as the sewing apparatus, instead of the embroidery sewing machine 4.

What is claimed is:

1. A sewing apparatus management system, comprising:
a plurality of sewing apparatuses;
a plurality of terminals each provided corresponding to each of the plurality of sewing apparatuses; and
a management computer connected to the plurality of terminals via a network to manage the plurality of sewing apparatuses, management information for the plurality of sewing apparatuses being transmitted from the plurality of terminals to the management computer, wherein the management computer comprises:
a classification information storage device to store classification information obtained by identifying the plurality of sewing apparatuses and classifying the same into a plurality of groups according to a category; and
a managing device that selectively manages, when one of the plurality of groups is selected on the management computer, at least one sewing apparatus belonging to the selected group.

2. The sewing apparatus management system according to claim 1, further comprising a category setting device that sets the category to be used for classifying the plurality of sewing apparatuses on the classification information storage device.

3. A sewing apparatus management system, comprising:
a plurality of sewing apparatuses;
a plurality of terminals, a terminal provided corresponding to each sewing apparatus; and
a management computer connected to the plurality of terminals via a network to manage the plurality of sewing apparatuses, management information for the plurality of sewing apparatuses being transmitted from the plurality of terminals to the management computer, wherein the management computer comprises:
a display device;
an input device;
a classification information storage device to previously store classification information obtained by identifying the plurality of sewing apparatuses and classifying the same into a plurality of groups according to a category; and
a display controller that selectively displays, when one of the plurality of groups is selected on the management computer using the input device, the various management information on at least one management apparatus belonging to the selected group.

4. The sewing apparatus management system according to claim 3, further comprising a transmission control device that selectively transmits instruction information inputted from the input device on the management computer to at least one terminal of the at least one sewing apparatus belonging to the selected group.

5. The sewing apparatus management system according to claim 3, further comprising a category setting device that sets the category to be used for classifying the plurality of sewing apparatuses on the classification information storage device.

6. The sewing apparatus management system according to claim 3, wherein the management information includes work progress information on the plurality of sewing apparatuses, and the management computer comprises a progress display device that allows the display device to display the work progress information in a predetermined format.

7. The sewing apparatus management system according to claim 3, wherein the management information includes embroidery data necessary for work performed by the plurality of sewing apparatuses, and the management computer comprises an embroidery data display device that allows the display device to display the embroidery data in a predetermined format and an embroidery data setting device that selectively sets contents of the embroidery data.

8. The sewing apparatus management system according to claim 3, further comprising a display item setting device that selectively sets an item of the management information displayed on the display device.

9. A sewing apparatus management system, comprising:
 a plurality of sewing apparatuses;
 a plurality of terminals, a terminal provided corresponding to each sewing apparatus; and
 a plurality of management computers each connected to the plurality of terminals via a network to cooperatively manage the plurality of sewing apparatuses, management information on the plurality of sewing apparatuses being transmitted from the plurality of terminals to the plurality of management computers, wherein each of the plurality of management computers is accessible to at least one terminal of at least one sewing apparatus assigned thereto to control the at least one sewing apparatus, and a specific management computer among the plurality of management computers is authorized to gain access to other unspecific management computers and to terminals of sewing apparatuses assigned to the other unspecific management computers.

10. The sewing apparatus management system according to claim 9, wherein each of the plurality of management computers includes a display device, an input device, and a limited display control device that limitedly displays, in response to an operation of the input device, the management information received from the at least one accessible terminal, and the specific management computer includes a privileged display control device that privilegedly displays, in response to an operation of the input device, the various management information received, by authorized access, from the other unspecific management computers and from the terminals of the sewing apparatuses assigned to the other unspecific management computers.

11. The sewing apparatus management system according to claim 10, wherein the various management information includes work progress information on the plurality of sewing apparatuses, and the management computer comprises a progress display device that allows the display device to display the work progress information in a predetermined format.

12. The sewing apparatus management system according to claim 10, wherein the various management information includes embroidery data necessary for work performed by the plurality of sewing apparatuses, and the management computer comprises an embroidery data display device that allows the display device to display the embroidery data in a predetermined format and an embroidery data setting device that selectively sets contents of the embroidery data.

13. The sewing apparatus management system according to claim 10, further comprising a display item setting device that selectively sets an item of the management information displayed on the display device.

14. The sewing apparatus management system according to claim 9, further comprising an assignment setting device that selectively sets assignments of the plurality of sewing apparatuses to the plurality of management computers.

15. The sewing apparatus management system according to claim 14, wherein the management information includes work progress information on the plurality of sewing apparatuses, and each of the management computers comprises a progress display device that allows the display device to display the work progress information in a predetermined format.

16. The sewing apparatus management system according to claim 14, wherein the various management information includes embroidery data necessary for work performed by the plurality of sewing apparatuses, and each of the management computers comprises an embroidery data display device that allows the display device to display the embroidery data in a predetermined format and an embroidery data setting device that selectively sets contents of the embroidery data.

17. The sewing apparatus management system according to claim 14, further comprising a display item setting device that selectively sets an item of the management information displayed on the display device.

18. A sewing management system, comprising:
 at least one control system including:
  a display device;
  a controller having programs for storing and displaying data and issuing sewing instructions;
  a storage device for storing data; and
  a communications network;
 a plurality of sewing machines; and
 a plurality of terminals, a terminal associated with each sewing machine and connected to the communications network, wherein each terminal provides sewing machine data to the controller, the controller classifying the sewing machine data into management categories and sub-categories to facilitate management control by assigning subsets of the plurality of sewing machines to at least the management categories.

19. The sewing management system according to claim 18, wherein the at least one control system comprises a plurality of control systems, a first control system functioning as a main system, and all other control systems functioning as a control sub-systems, each of the control system and the control sub-systems having a display device, a controller and a storage device and is linked to the communications network, the main control system assigning sewing machines by category to the sub-systems for management.

20. The sewing management system according to claim 19, wherein the main control system can, by selecting a control sub-system, manage the sewing machines assigned to the selected control sub-system.

* * * * *